(12) United States Patent
Jusko et al.

(10) Patent No.: US 11,038,900 B2
(45) Date of Patent: Jun. 15, 2021

(54) STRUCTURAL COMMAND AND CONTROL DETECTION OF POLYMORPHIC MALWARE

(71) Applicant: Cisco Technology, Inc., San Jose, CA (US)

(72) Inventors: Jan Jusko, Prague (CZ); Martin Rehak, Prague (CZ); Danila Khikhlukha, Prague (CZ); Harshit Nayyar, Alberta (CA)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 16/120,580

(22) Filed: Sep. 4, 2018

(65) Prior Publication Data
US 2020/0076832 A1    Mar. 5, 2020

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
CPC ............. H04L 63/1416; H04L 63/1425; H04L 63/145; H04L 63/1408; H04L 63/0281; H04L 2463/144
See application file for complete search history.

(56) References Cited

U.S. PATENT DOCUMENTS

| 8,402,543 | B1 * | 3/2013 | Ranjan | H04L 63/1416 |
| | | | | 726/23 |
| 9,635,049 | B1 | 4/2017 | Oprea et al. | |
| 9,948,671 | B2 | 4/2018 | Perdisci et al. | |
| 10,129,276 | B1 * | 11/2018 | Raviv | H04L 63/1441 |
| 2013/0014261 | A1 * | 1/2013 | Millliken | H04L 63/145 |
| | | | | 726/24 |
| 2019/0158520 | A1 * | 5/2019 | DiValentin | H04L 63/145 |

OTHER PUBLICATIONS

Bipartite graph—Wikipedia—Bipartite graph; https://en.wikipedia.org/wiki/Bipartite_graph; pp. 1-8.
Chau, et al.,"Polonium: Tera-Scale Graph Mining for Malware Detection", KDD-LDMTA '10, Jul. 25, 2010, Washington, DC, USA., 8 pages, 2010, ACM.
(Continued)

*Primary Examiner* — Harunur Rashid
(74) *Attorney, Agent, or Firm* — Behmke Innovation Group LLC; Kenneth J. Heywood; Jonathon P. Western

(57) ABSTRACT

In one embodiment, a service receives a plurality of process hashes for processes executed by a plurality of devices. The service receives traffic data indicative of traffic between the plurality of devices and a plurality of remote server domains. The service forms a bipartite graph based on the processes hashes and the traffic data. A node of the graph represents a particular process hash or server domain and an edge between nodes in the graph represents network traffic between a process and a server domain. The service identifies, based on the bipartite graph, a subset of the plurality of processes as exhibiting polymorphic malware behavior. The service causes performance of a mitigation action in the network based on the identified subset of processes identified as exhibiting polymorphic malware behavior.

18 Claims, 8 Drawing Sheets

(56) References Cited

OTHER PUBLICATIONS

Gardiner, et al., "Command & Control: Understanding, Denying and Detecting", 38 pages, Feb. 2014, University of Birmingham.

Gu, et al., "BotMiner: Clustering Analysis of Network Traffic for Protocol- and Structure-Independent Botnet Detection", 17th USENIX Security Symposium, pp. 139-154, 2008, USENIX Association.

Machlica, et al., "Learning detectors of malicious web requests for intrusion detection in network traffic", arXiv:1702.02530v1, 21 pages, Feb. 8, 2017, arXiv.org.

Tamersoy, et al., "Guilt by association: large scale malware detection by mining file-relation graphs", KDD '14 Proceedings of the 20th ACM SIGKDD international conference on Knowledge discovery and data mining, pp. 1524-1533, 2014, ACM.

Venzhega, et al.,"Graph-based malware distributors detection", WWW '13 Companion Proceedings of the 22nd International Conference on World Wide Web, pp. 1141-1144, 2013, ACM.

\* cited by examiner

STRUCTURAL COMMAND AND CONTROL DETECTION OF POLYMORPHIC MALWARE

TECHNICAL FIELD

The present disclosure relates generally to computer networks, and, more particularly, to structural command and control (C&C) detection of polymorphic malware.

BACKGROUND

One type of network attack that is of particular concern in the context of computer networks, such as IoT networks, is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource. To avoid detection, many malware binaries now use polymorphism, whereby the malware binary changes across infected devices. Thus, anti-malware programs looking for a particular malware binary signature may ultimately fail to detect the malware binary, as it evolves.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
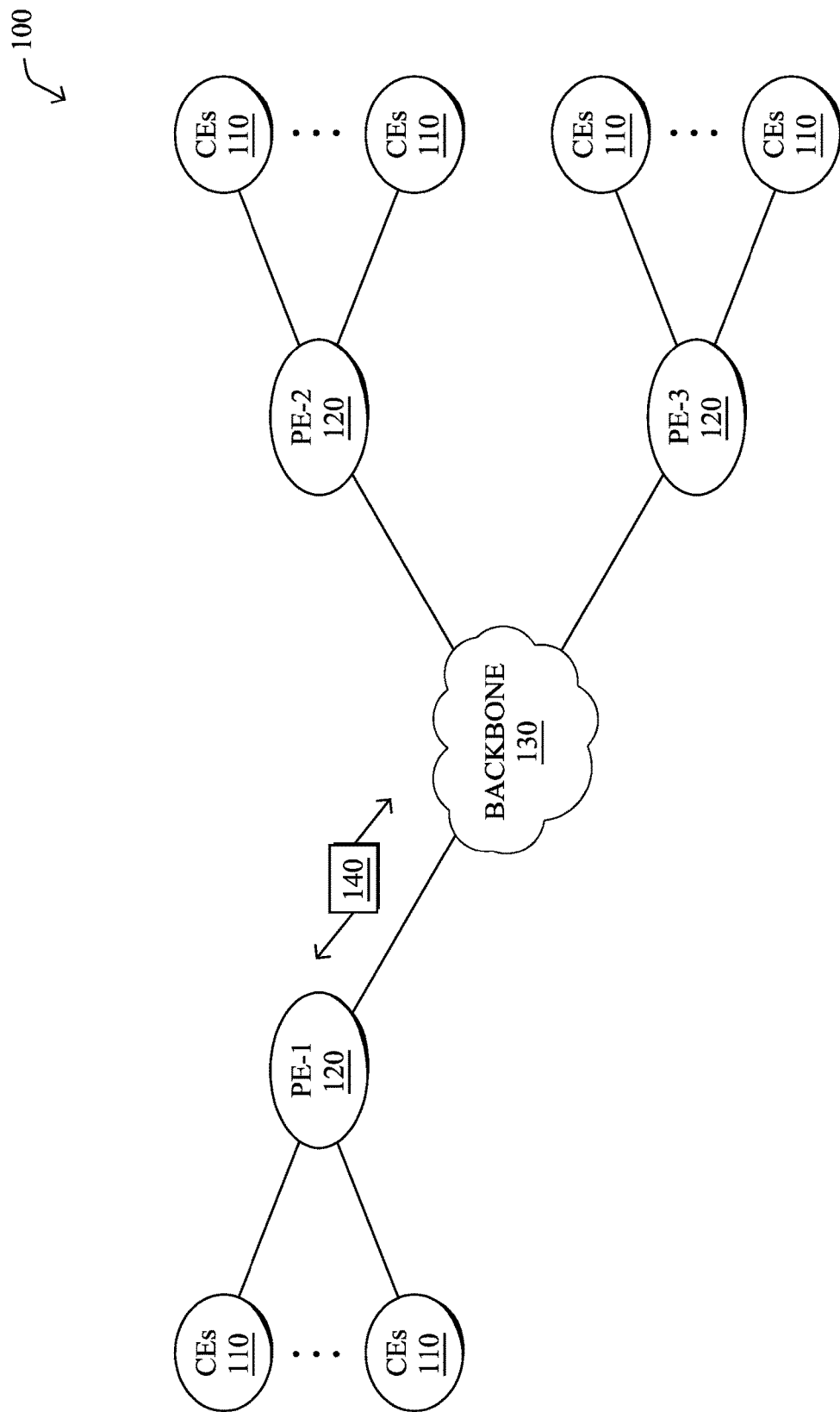
FIGS. 1A-1B illustrate an example communication network.

According to one or more embodiments of the disclosure, a service receives a plurality of process hashes for processes executed by a plurality of devices. The service receives traffic data indicative of traffic between the plurality of devices and a plurality of remote server domains. The service forms a bipartite graph based on the processes hashes and the traffic data. A node of the graph represents a particular process hash or server domain and an edge between nodes in the graph represents network traffic between a process and a server domain. The service identifies, based on the bipartite graph, a subset of the plurality of processes as exhibiting polymorphic malware behavior. The service causes performance of a mitigation action in the network based on the identified subset of processes identified as exhibiting polymorphic malware behavior.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
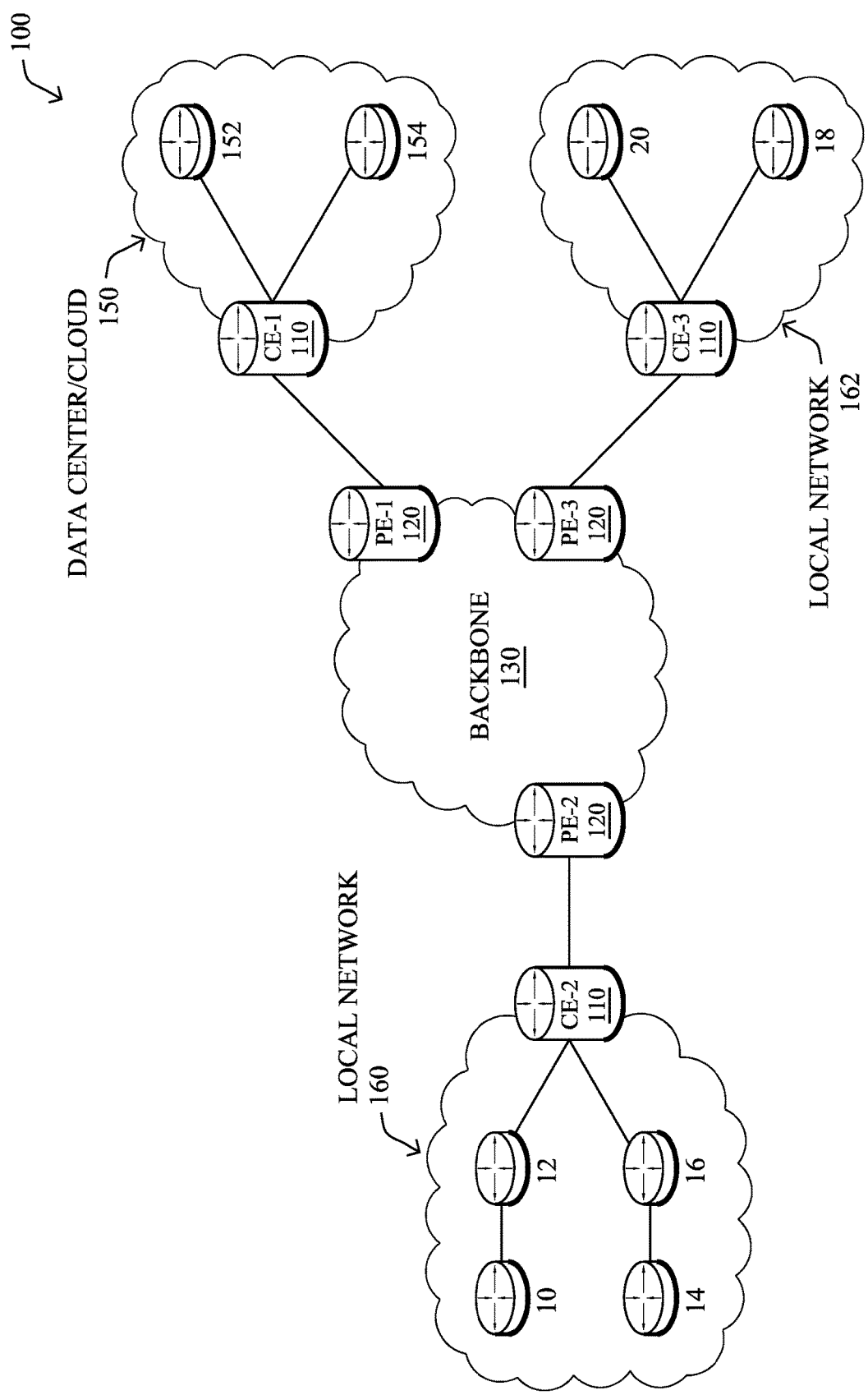

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
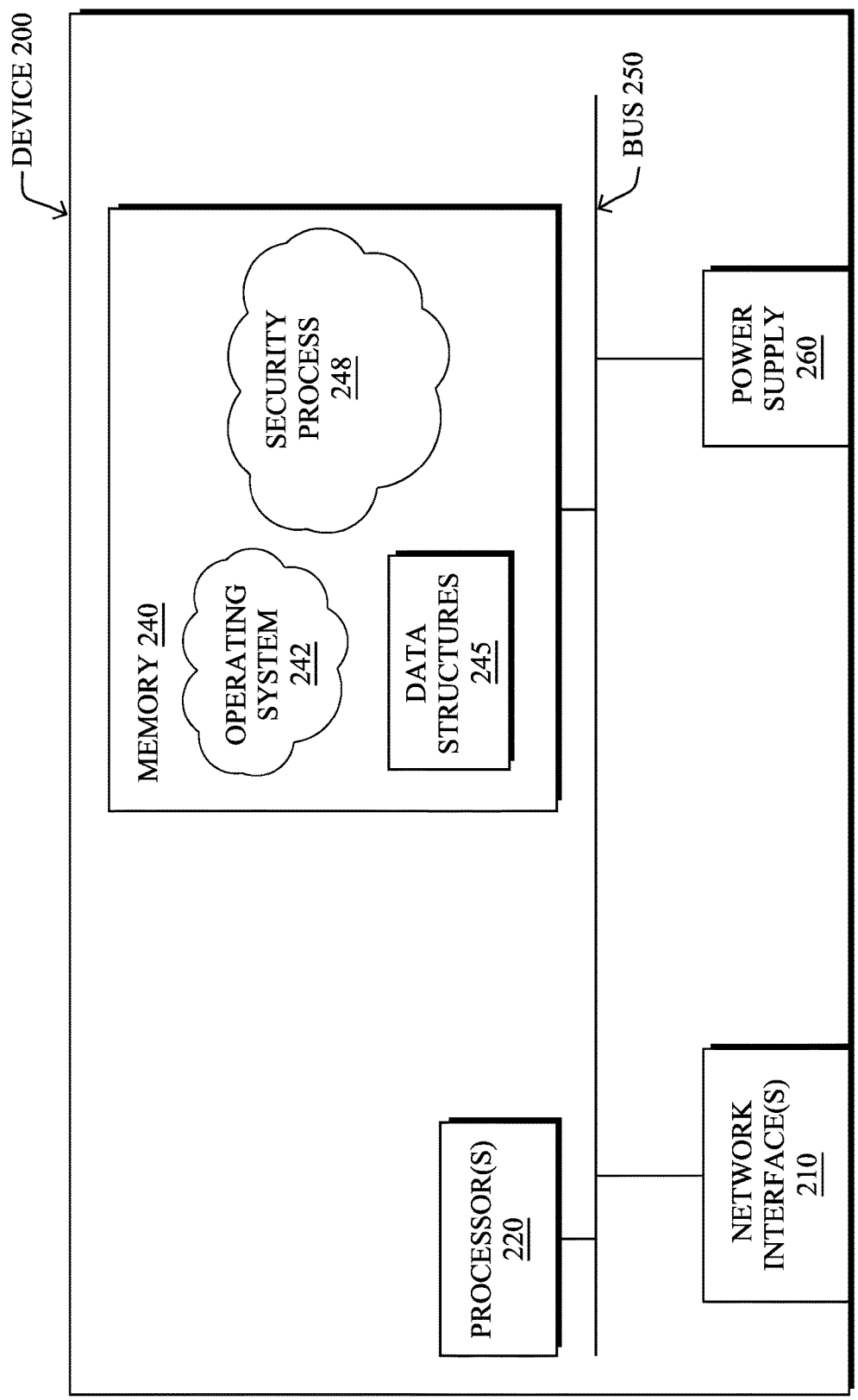
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a security process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, security process 248 may execute one or more machine learning-based classifiers to classify encrypted traffic in the network (and its originating application) for any number of purposes. In one embodiment, security process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, security process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Security process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, security process 248 can use the model M to classify new data points, such as information regarding new traffic flows in the network. Often, M is a statistical model, and the cost function is inversely proportional to the likelihood of M, given the input data.

In various embodiments, security process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that security process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, security process 248 may assess the captured telemetry data on a per-flow basis. In other embodiments, security process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
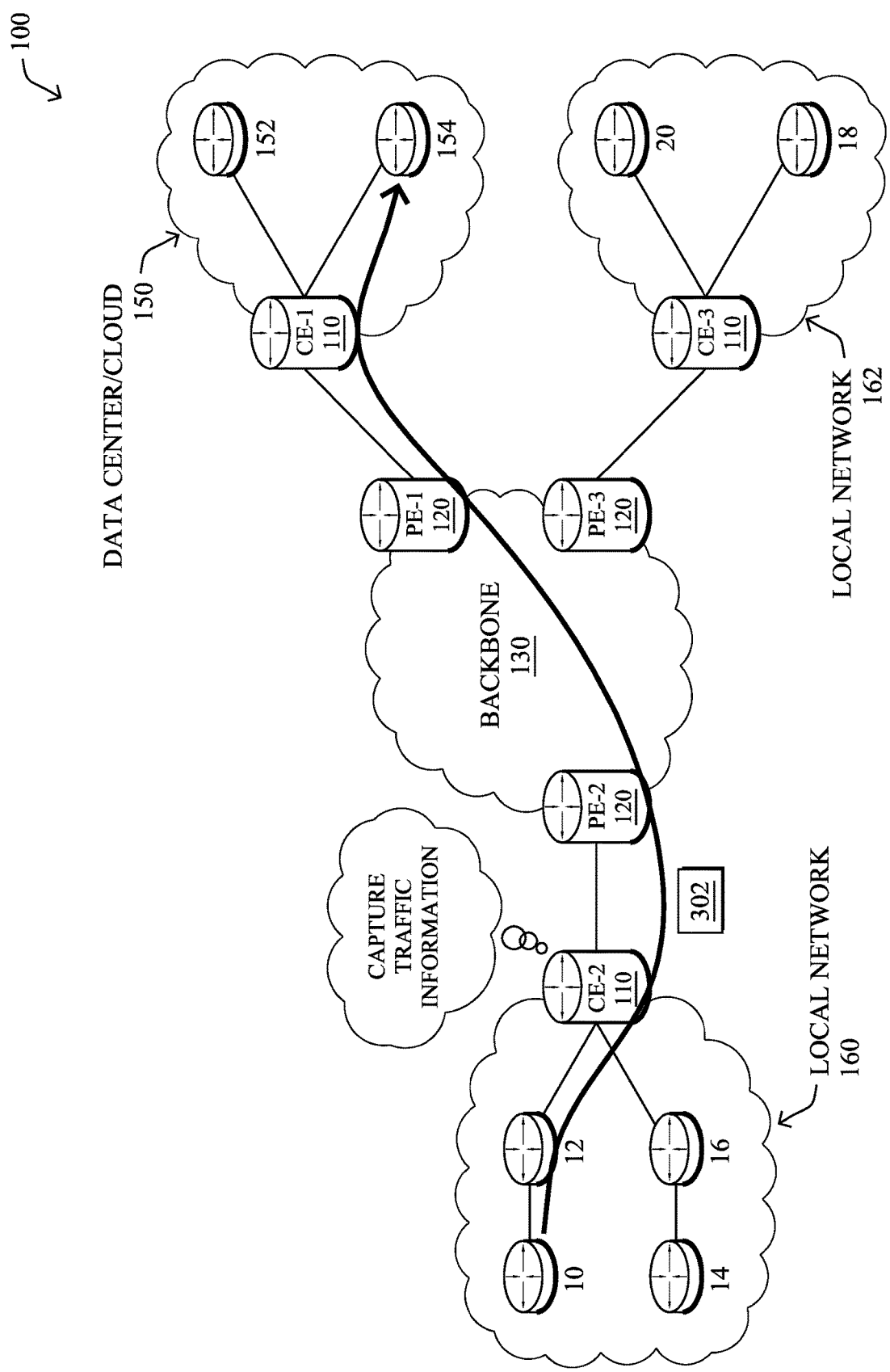
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, many malware families now use polymorphism, in order to avoid detection. In general, polymorphism allows copies of malware to change across different infected devices, thereby exhibiting different signatures. This makes hash-based malware detection ineffective for these forms of malware, as each malware instance has a different process hash.

Structural Command and Control Detection of Polymorphic Malware

The techniques herein introduce a structural approach to detecting polymorphic malware in a network and its command and control (C&C) infrastructure. In some aspects, the techniques herein leverage certain insights about the operational constraints of many malware C&C channels, to detect malware-like behavior among different process hashes. When such malware is detected, any number of mitigation actions can be initiated in the network, such as blocking traffic associated with the infected devices, blocking traffic to the C&C infrastructure, and/or sending an alert to a network administrator.

Specifically, according to one or more embodiments of the disclosure as described in detail below, a service receives a plurality of process hashes for processes executed by a plurality of devices. The service receives traffic data indicative of traffic between the plurality of devices and a plurality of remote server domains and, more specifically, between the processes on the devices and the different domains. The service forms a bipartite graph based on the processes hashes and the traffic data. A node of the graph represents a particular process hash or server domain and an edge between nodes in the graph represents network traffic between a process and a server domain. The service identifies, based on the bipartite graph, a subset of the plurality of processes as exhibiting polymorphic malware behavior. The service causes performance of a mitigation action in the network based on the identified subset of processes identified as exhibiting polymorphic malware behavior.

Illustratively, the techniques described herein may be performed by hardware, software, and/or firmware, such as in accordance with the security process 248, which may include computer executable instructions executed by the processor 220 (or independent processor of interfaces 210) to perform functions relating to the techniques described herein.

Operationally, the techniques herein introduce a method capable of detecting polymorphic malware communicating with its C&C servers, based on the structural properties of such network communication. To better understand the techniques herein, several observations about polymorphic malware have been made. First, a typical property of polymorphic malware is that there exist thousands of, or even hundreds of thousands of, repackaged versions of a malicious binary in any given malware family. However, at the same time, the behavior of all of these versions is still the same.

Consider, for example, a common malware infection vector: drive-by download, whereby a malicious binary downloaded by (soon to be) infected clients is rapidly rotated. As a result, each version of the malicious binary is present only on a very limited number of infected clients and, typically, on a single victim host within the observed client base. Assuming that one has a limited view of all infected devices word-wide, it is reasonable to assume that majority of client devices infected with a specific malware family have a unique version of the malicious binary.

From a network perspective, C&C servers (e.g., different domains) do typically exhibit some temporal stability, at least in the short term. Indeed, each C&C server used by malware must be available and stable at least for some period of time. In that time, many of the malicious binaries connect to this server. It is also to be expected that the C&C servers migrate in time. However, there is always a short period of time during which multiple malicious binaries connect to the same server(s). An extreme way to avoid detection at the network level would be to use a different server to be contacted by each unique version of malicious binary, as is occasionally the case for some government-level attacks. However, considering the large number of versions of polymorphic malware, this would be a costly solution for widespread malware families that rely on scale for monetization, such as using the botnet for cryptomining, adware, ransomware, and the like. Therefore, most malware authors avoid this kind of extreme server diversification.

In conclusion, the main observations that can be made about polymorphic malware are as follows:
1. Malicious binaries of a polymorphic malware family are unique to a single client device or a very small set of client devices.
2. The malicious binaries connect to a limited set of C&C servers, which might migrate over time.

The above observations can be leveraged to construct a malware detection service in a network (e.g., a local service in the local network or cloud-based service) that detects polymorphic malware using both client-level and network-level information. In particular, using the network monitoring techniques described previously, the service can receive traffic data indicative of traffic between the plurality of client devices being monitored and a plurality of remote server domains. In addition, the service can receive client-level data from a monitoring process on each client device, such as an anti-malware program, to identify the binary on the client devices that initiated a given server connection. For example, the monitoring programs on the client device may send process hashes to the server for association with the traffic data.

According to various embodiments, the malware detection service may use the received client-level data and the captured traffic data to construct a bipartite graph. In general, a bipartite graph comprises two disjoint and independent sets of nodes/vertices, with edges of the graph connecting exactly one node in the first set to exactly one node in the second set. In the context of polymorphic malware detection, the first set of graph nodes may represent the process hashes of the processes on the client devices under scrutiny and the second set of graph nodes may represent the servers/server domains to which the processes communicated. Thus, an edge between nodes in such a graph may represent a communication between a particular process and a particular server domain.

Figure 4A:
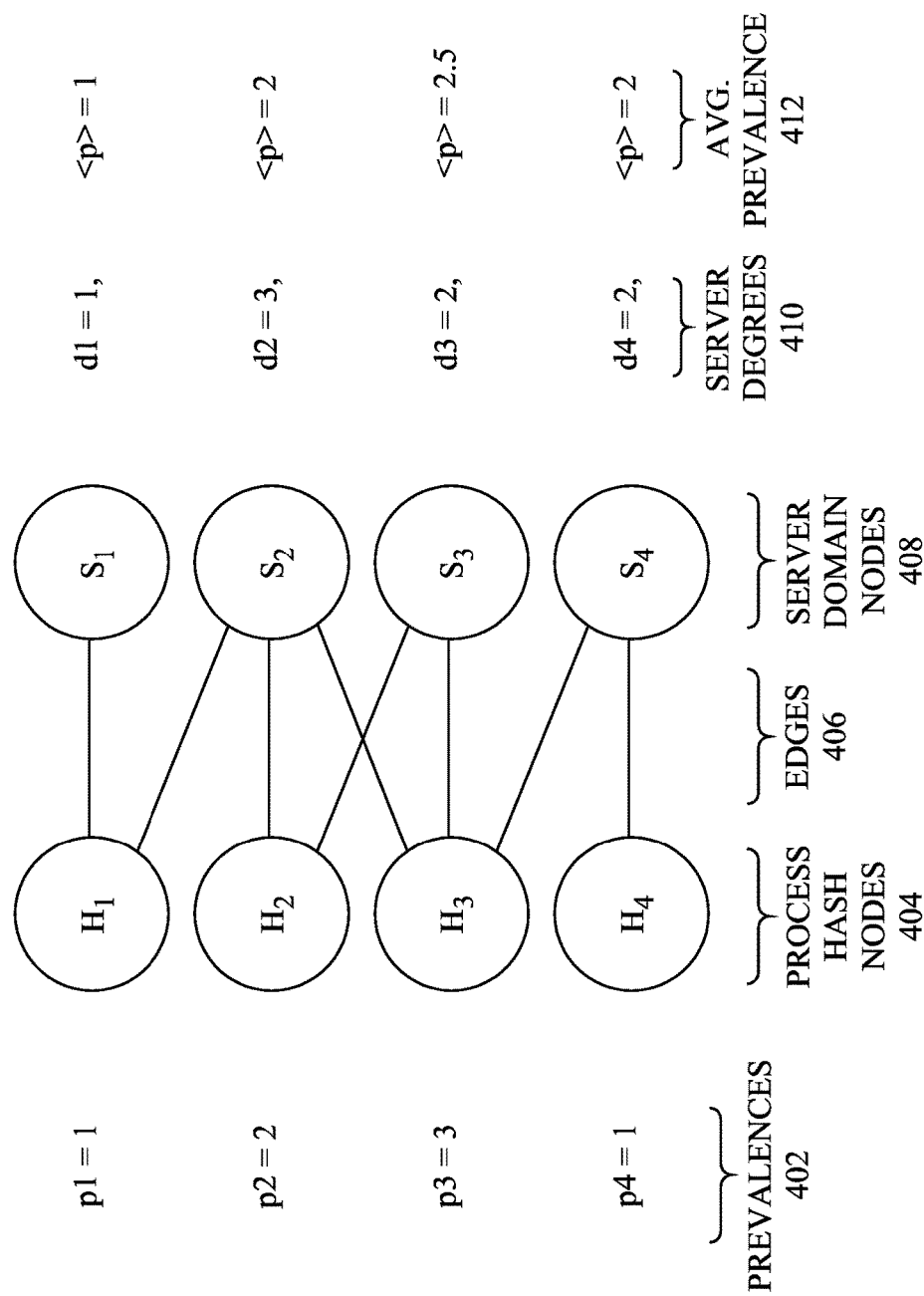
FIGS. 4A-4B illustrate examples of a bipartite graph.
Figure 4B:
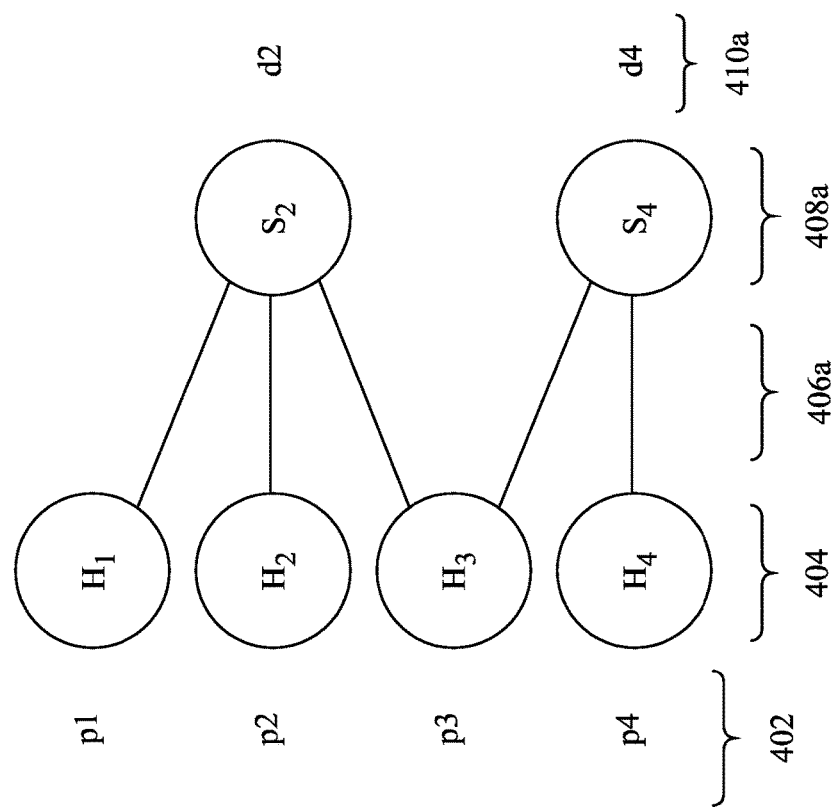

FIGS. 4A-4B illustrate examples of a bipartite graph, according to various embodiments. As shown in FIG. 4A, bipartite graph 400 may represent the process hashes of the binaries/processes on the client devices as process hash nodes 404. In addition, bipartite graph 400 may represent the server domains to which the processes communicated as server domain nodes 408. Edges 406 in bipartite graph 400 between nodes 404 and nodes 408 represent network traffic/communications between particular processes/process hashes and particular server domains. For example, consider the case in which there are four process hash nodes 404: $H_1$-$H_4$ and four server domain nodes 408: $S_1$-$S_4$. In such a case, $H_1$ has edges 406 with $S_1$ and $S_2$, indicating that process with this hash attempted to communicate with both of these corresponding network domains. Conversely, $H_4$ has only a single edge 406 with $S_4$, indicating that the process with this hash connected to only a single server domain, $S_4$.

Also as shown, the malware detection service may calculate the prevalence 402 of each process hash. In general, prevalences 402 represent the number of client devices on which the corresponding binary is present. For example, as shown, prevalences 402 may comprise prevalences $p_1$-$p_4$, each of which may be associated with process hashes $H_1$-$H_4$, respectively. Thus, process hash $H_1$ was observed on only a single client device, and has an associated prevalence of $p_1=1$. $H_2$, however, was observed on two separate client devices, and has an associated prevalence of $p_2=2$. Likewise, $H_3$ was observed on three different client devices and has a prevalence of $p_3=3$. Finally, $H_4$ was observed on only a single client device and has a prevalence of $p_4=1$.

In some embodiments, the malware detection service may also calculate, for each of the server domain nodes 408, the degree 410 of the server domain represented by that node. In general, the degree of a given server domain represents the number of different process hashes that connected to the server domain. For example, each of server domains $S_1$-$S_4$ may be associated with a corresponding server degree 410: $d_1$-$d_4$, respectively. Since only a single process hash, $H_1$, connected to server domain $S_1$, its corresponding server degree $d_1=1$. However, as three process hashes, $H_1$-$H_3$, connected to server domain $S_2$, server degree $d_2=3$. Likewise, both $S_3$ and $S_4$ were contacted by exactly two process hashes, making $d_3=2$ and $d_4=2$.

Another metric that the malware detection service may calculate and associate with server domain nodes 408 of bipartite graph 400 is an average prevalence 412 of associated hashes. In general, each average prevalence may be calculated as $<p>=sum(p)/d$, where p is the prevalences of the process hashes that contacted that server domain. For example, the average prevalence $<p>$ for $S_3=[p_2+p_3]/d_3=[2+3]/2=2.5$.

In various embodiments, the service may prune the formed bipartite graph, before making any malware determinations, so as to represent only servers and hashes that exhibit network communication patterns similar to those of polymorphic malware. More specifically, the service may select sever domains that were contacted by at least N-number of client binaries/processes such that the average prevalence of each binary associated with the domain is less than or equal to a specified threshold K. Both N and K are tuning parameters and can be the subject of optimization, in some cases. Prototyping of the techniques herein indicated, for example, that values of N=4 and K=2 were suitable for polymorphic malware detection, although other parameters can be used, as desired.

FIG. 4B illustrates an example of bipartite graph 414, which is pruned from graph 400 by setting thresholds of N=2 and K=2. In doing so, pruned graph 414 includes only a subset 408a of server domain nodes 408 and a subset 406a of edges 406 from graph 400. Notably, $S_1$ was pruned from graph 400 because it does not fulfill requirement on its degree. Likewise, $S_3$ was also pruned from graph 400, since it exceeds the maximal allowed average prevalence of connecting hashes.

In the next step of processing, the polymorphic malware detection service may group together the process hashes that belong to the same malware family and the server domains that are part of the same C&C infrastructure. In one embodiment, the service may do so by performing co-clustering on the constructed (and potentially pruned) bipartite graph. Namely, the service may cluster the process hashes by the servers to which they connected. Likewise, the service may cluster the server domains based on the process hashes that connected to them. The co-clustering approach may also preserve the edges/connections between the resulting clusters of hashes and clusters of servers. The malware detection service can use this association to link malicious binaries to their C&C infrastructure.

Figure 5:
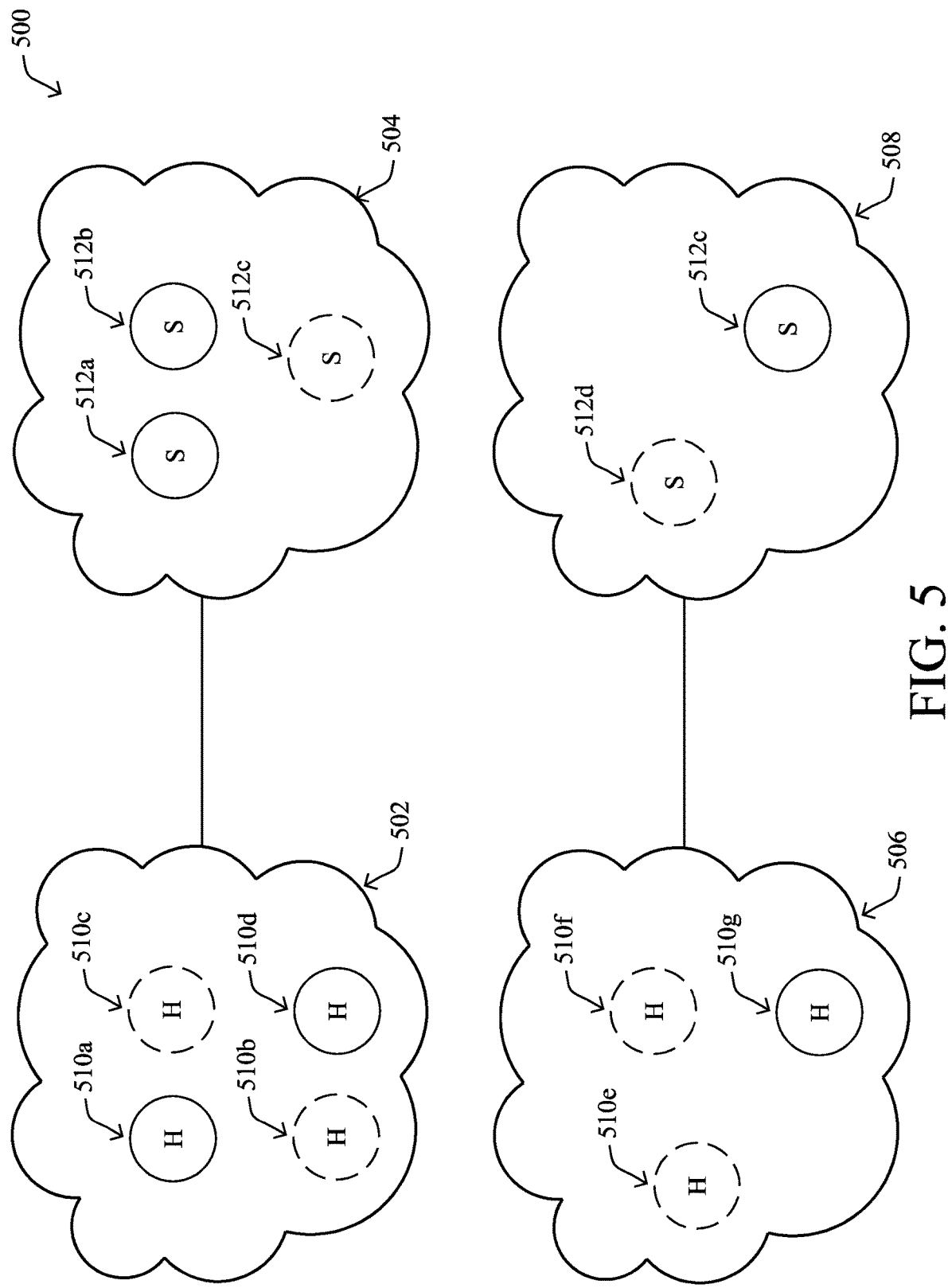
FIG. 5 illustrates an example of clustering bipartite graph nodes.

FIG. 5 illustrates an example of clustering bipartite graph nodes, according to various embodiments. As shown, the malware detection service may use the bipartite graph to co-cluster the process hash and server domain nodes of the graph into clusters 502-508. As a result, hash cluster 502 may comprise process hashes 510a-510d, hash cluster 506 may comprise process hashes 510e-510f, server cluster 504 may comprise server domains 512a-512c, and server cluster 508 may comprise server domains 512d-512e. Hash cluster 502 may be associated/linked to server cluster 504 and hash cluster 506 may be associated/linked to server cluster 508, based on the edges of the bipartite graph. Notably, process hashes 510a-510d in hash cluster 502 may have communicated with the server domains 512a-512c in server cluster 504. Likewise, process hashes 510e-510g in hash cluster 506 may have communicated with server domains 512d-512e in server cluster 508.

According to various embodiments, the malware detection service may leverage ground truth knowledge about a process hash 510 and/or server domain 512 in a given cluster, to label the other process hashes or server domains in that cluster. While most of the hashes 510 in any given cluster are unknown and likely have never been seen by an anti-malware program, it is common that at least one hash has been seen and identified as belonging to a specific malware family. Thus, if a cluster includes at least one process hash 510 flagged by an anti-malware program as being malware, the service may also flag the other process hashes 510 in that cluster as also belonging to the same family of polymorphic malware. This can be thought of as a tuning parameter and the system might require that at least x % of hashes are known malicious before the cluster is marked malicious and other hashes are convicted. For example, as shown, assume that hashes 510b-510c in hash cluster 502 were flagged as being malware. In such a case, the service may similarly flag hashes 510a and 510d as also belonging to the same polymorphic malware family as that of hashes 502b-502c.

If any server domain 512 is associated with the process hash 510 deemed as malware, it too may be flagged as being a C&C server. In addition, any other server domains 512 in the server cluster may also be flagged as C&C servers. For example, assume that process hashes 510b-510c communicated with server domain 512c in server cluster 504. In such a case, the malware detection service may also flag server domains 512a-512b in server cluster 504 as also belonging to the same C&C infrastructure associated with the polymorphic malware family of cluster 502.

Figure 6:
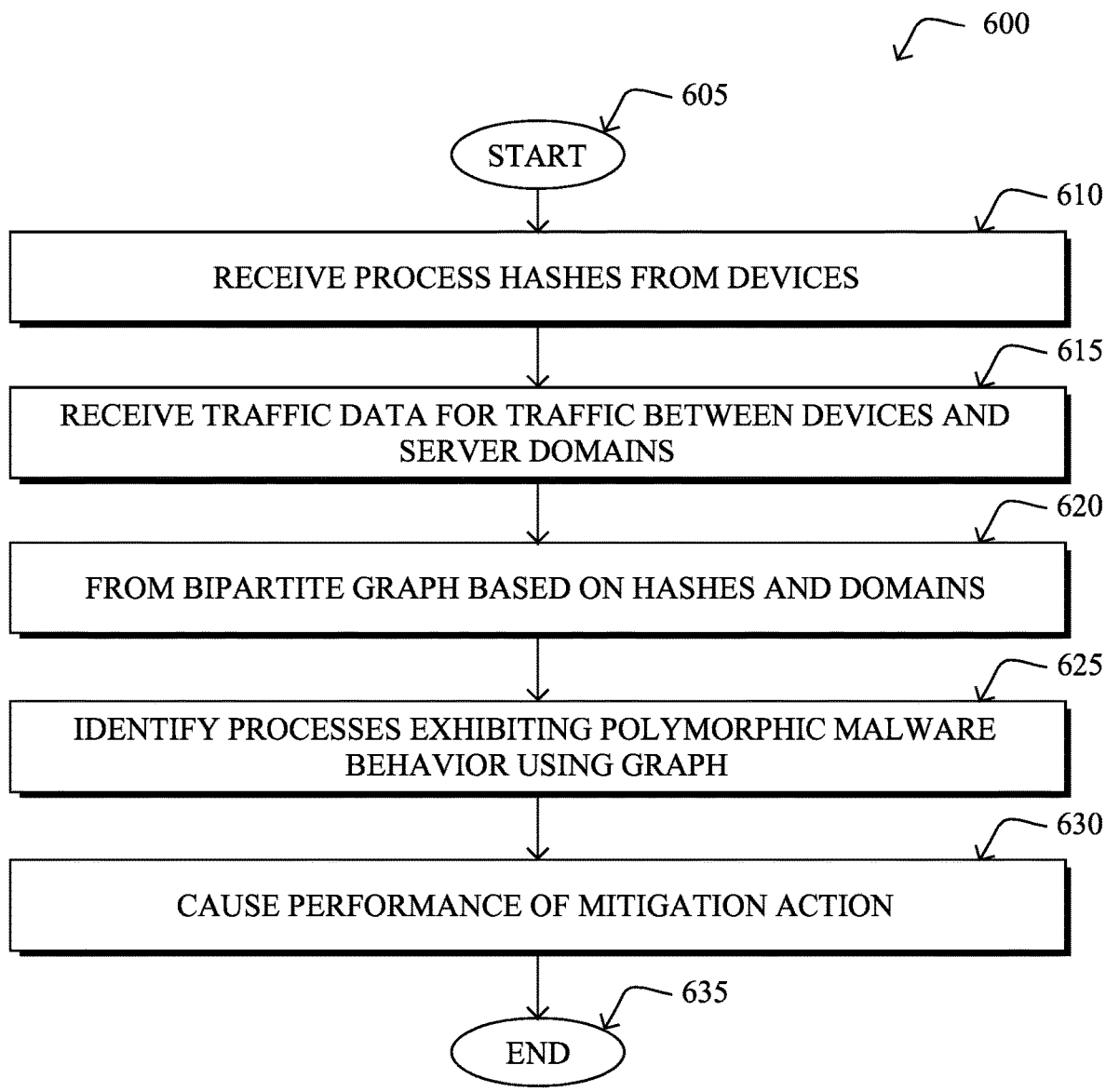
FIG. 6 illustrates an example simplified procedure for detecting polymorphic malware.

FIG. 6 illustrates an example simplified procedure for detecting polymorphic malware in a network, in accordance with one or more embodiments described herein. For example, a non-generic, specifically configured device (e.g., device 200) may perform procedure 600 by executing stored instructions (e.g., process 248), to provide a network security service. The procedure 600 may start at step 605, and continues to step 610, where, as described in greater detail above, the service may receive a plurality of process hashes for processes executed by a plurality of devices. In some embodiments, each device may execute an anti-malware or other monitoring program that calculates hashes of the binaries on the device. In turn, the monitoring program may send the computed hashes to the service, as well as behavioral information regarding the binaries/processes. For example, the monitoring program may capture and report data regarding the ports, times, addresses, etc., used by a given process to communicate with a remote server.

At step 615, as detailed above, the service may receive traffic data indicative of traffic between the plurality of devices and a plurality of remote server domains. Such information may be captured and reported by any number of intermediary networking devices between the client devices hosting the processes in step 610 and any number of server domains (e.g., switches, routers, etc.). For example, the traffic data may comprise Netflow or IPFIX records reported to the service that the service can associate with the process hashes that initiated the connections with the servers.

At step 620, the service may form a bipartite graph based on the processes hashes and the traffic data, as described in greater detail above. In various embodiments, a node of the graph represents a particular process hash or server domain. Notably, the bipartite graph may comprise a first set of nodes that represent the process hashes and a second set of nodes that represent the server domains to which the process hashes connected. In turn, an edge between nodes in the graph represents network traffic between a particular process and a particular server domain.

At step 625, as detailed above, the service may identify, based on the bipartite graph, a subset of the plurality of processes as exhibiting polymorphic malware behavior. In some embodiments, the service may first prune the resulting graph, so as to select only nodes for server domains that were contacted by at least an N-number threshold of binaries and the average prevalence of each binary is less than or equal to a certain threshold K. In further embodiments, the service may perform co-clustering on the process hash and server domain nodes of the graph and propagate malware labels to all constituents of a cluster if at least one constituent is known to be malware.

At step 630, the service may cause the performance of a mitigation action in the network based on the identified subset of processes identified as exhibiting polymorphic malware behavior, as described in greater detail above. In some embodiments, the mitigation action may entail blocking, redirecting, or performing additional analysis of any traffic associated with a device on which malware was detected. In further embodiments, the service may block, redirect, or perform additional analysis of any traffic associated with a server domain suspected as being part of the C&C infrastructure for the malware. In yet another embodiment, the mitigation action may entail sending an alert to a user display, so as to notify a network administrator, security expert, or other interested party of the detected infection. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the detection of polymorphic malware in a network, it is to be understood that various other adaptations and modifications may be made within the spirit and scope of the embodiments herein. For example, while certain protocols are shown, other suitable protocols may be used, accordingly. Note also that while the term "polymorphic malware" is used above to describe the disclosed techniques, this term can also encompass the detection of frequently repackaged malware, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a service, a plurality of process hashes for processes executed by a plurality of devices;
receiving, at the service, traffic data indicative of traffic between the plurality of devices and a plurality of remote server domains;
forming, by the service, a bipartite graph based on the process hashes and the traffic data, wherein the bipartite graph comprises a first set of nodes, each of which representing a process hash for a process executing on a device, and a second set of nodes, each of which representing a server domain, and wherein an edge in the bipartite graph between a node in the first set and a node in the second set represents network traffic between a particular process and a particular server domain;
identifying, by the service, a subset of the plurality of processes as exhibiting polymorphic malware behavior based at least on an average prevalence of each process hash that is associated with each server domain according to the bipartite graph; and
causing, by the service, performance of a mitigation action in the network based on the identified subset of processes identified as exhibiting polymorphic malware behavior,
wherein the identifying of the subset of the plurality of processes as exhibiting polymorphic malware behavior comprises:
pruning the bipartite graph by selecting server domains that are contacted by a threshold number of the processes such that the average prevalence of each process hash that is associated with each server domain is less than or equal to a defined threshold.

2. The method as in claim 1, wherein the mitigation action comprises one of: blocking network traffic associated with a device hosting one of the processes identified as exhibiting polymorphic malware behavior, blocking network traffic associated with a server domain, or generating an alert regarding the identified processes.

3. The method as in claim 1, wherein identifying, by the service and based on the bipartite graph, the subset of the plurality of processes as exhibiting polymorphic malware behavior further comprises:
co-clustering the process hashes and server domains in the graph into clusters by clustering the process hashes based on the server domains to which they connected and by clustering the server domains based on the processes hashes that connected to them; and
determining that a process hash in a particular one of the clusters is associated with malware.

4. The method as in claim 3, wherein identifying, by the service and based on the bipartite graph, the subset of the plurality of processes as exhibiting polymorphic malware behavior further comprises:
labeling the other process hashes in the particular cluster as associated with malware.

5. The method as in claim 3, wherein identifying, by the service and based on the bipartite graph, the subset of the plurality of processes as exhibiting polymorphic malware behavior further comprises:
labeling server domains in a cluster to which the particular cluster communicated as command and control servers.

6. The method as in claim 1, wherein the service receives the process hashes from anti-malware engines executed by the plurality of devices.

7. The method as in claim 1, wherein the service receives the traffic data from a router or switch.

8. The method as in claim 1, wherein the service is a cloud-based service.

9. An apparatus, comprising:
one or more network interfaces to communicate with a network;
a processor coupled to the network interfaces and configured to execute one or more processes; and
a memory configured to store a process executable by the processor, the process when executed configured to:
receive a plurality of process hashes for processes executed by a plurality of devices;
receive traffic data indicative of traffic between the plurality of devices and a plurality of remote server domains;
form a bipartite graph based on the process hashes and the traffic data, wherein the bipartite graph comprises a first set of nodes, each of which representing a process hash for a process executing on a device, and a second set of nodes, each of which representing a server domain, and wherein an edge in the bipartite graph between a node in the first set and a node in the second set represents network traffic between a particular process and a particular server domain;
identify a subset of the plurality of processes as exhibiting polymorphic malware behavior based at least on an average prevalence of each process hash that is associated with each server domain according to the bipartite graph; and
cause performance of a mitigation action in the network based on the identified subset of processes identified as exhibiting polymorphic malware behavior,
wherein the apparatus identifies the subset of the plurality of processes as exhibiting polymorphic malware behavior by:
pruning the bipartite graph by selecting server domains that are contacted by a threshold number of the processes such that the average prevalence of each process hash that is associated with each server domain is less than or equal to a defined threshold.

10. The apparatus as in claim 9, wherein the mitigation action comprises one of: blocking network traffic associated with a device hosting one of the processes identified as exhibiting polymorphic malware behavior, blocking network traffic associated with a server domain, or generating an alert regarding the identified processes.

11. The apparatus as in claim 9, wherein the apparatus identifies, based on the bipartite graph, the subset of the plurality of processes as exhibiting polymorphic malware behavior by:
co-clustering the process hashes and server domains in the graph into clusters by clustering the process hashes based on the server domains to which they connected and by clustering the server domains based on the processes hashes that connected to them; and
determining that a process hash in a particular one of the clusters is associated with malware.

12. The apparatus as in claim 11, wherein the apparatus identifies, based on the bipartite graph, the subset of the plurality of processes as exhibiting polymorphic malware behavior further by:
  labeling the other process hashes in the particular cluster as associated with malware.

13. The apparatus as in claim 9, wherein the apparatus identifies, based on the bipartite graph, the subset of the plurality of processes as exhibiting polymorphic malware behavior further by:
  labeling server domains in a cluster to which the particular cluster communicated as command and control servers.

14. The apparatus as in claim 9, wherein the apparatus receives the process hashes from anti-malware engines executed by the plurality of devices.

15. The apparatus as in claim 9, wherein the apparatus receives the traffic data from a router or switch.

16. The apparatus as in claim 9, wherein the apparatus provides a cloud-based service to the devices.

17. A tangible, non-transitory, computer-readable medium storing program instructions that cause a service to execute a process comprising:
  receiving, at the service, a plurality of process hashes for processes executed by a plurality of devices;
  receiving, at the service, traffic data indicative of traffic between the plurality of devices and a plurality of remote server domains;
  forming, by the service, a bipartite graph based on the process hashes and the traffic data, wherein the bipartite graph comprises a first set of nodes, each of which representing a process hash for a process executing on a device, and a second set of nodes, each of which representing a server domain, and wherein an edge in the bipartite graph between a node in the first set and a node in the second set represents network traffic between a particular process and a particular server domain;
  identifying, by the service, a subset of the plurality of processes as exhibiting polymorphic malware behavior based at least on an average prevalence of each process hash that is associated with each server domain according to the bipartite graph; and
  causing, by the service, performance of a mitigation action in the network based on the identified subset of processes identified as exhibiting polymorphic malware behavior,
  wherein the identifying of the subset of the plurality of processes as exhibiting polymorphic malware behavior comprises:
  pruning the bipartite graph by selecting server domains that are contacted by a threshold number of the processes such that the average prevalence of each process hash that is associated with each server domain is less than or equal to a defined threshold.

18. The computer-readable medium as in claim 17, wherein identifying, by the service and based on the bipartite graph, the subset of the plurality of processes as exhibiting polymorphic malware behavior further comprises:
  co-clustering the process hashes and server domains in the graph into clusters by clustering the process hashes based on the server domains to which they connected and by clustering the server domains based on the processes hashes that connected to them; and
  determining that a process hash in a particular one of the clusters is associated with malware.

* * * * *